US010587784B2

(12) United States Patent
Kubota

(10) Patent No.: US 10,587,784 B2
(45) Date of Patent: Mar. 10, 2020

(54) CLEANER AND VEHICLE WITH CLEANER

(71) Applicant: KOITO MANUFACTURING CO., LTD., Tokyo (JP)

(72) Inventor: Akinobu Kubota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 167 days.

(21) Appl. No.: 15/839,230

(22) Filed: Dec. 12, 2017

(65) Prior Publication Data

US 2018/0167536 A1    Jun. 14, 2018

(30) Foreign Application Priority Data

Dec. 12, 2016 (JP) .................................. 2016-240128

(51) Int. Cl.
| | |
|---|---|
| *H04N 5/217* | (2011.01) |
| *B60S 1/52* | (2006.01) |
| *B08B 3/02* | (2006.01) |
| *B60S 1/56* | (2006.01) |
| *B05B 1/26* | (2006.01) |
| *B60S 1/08* | (2006.01) |

(Continued)

(52) U.S. Cl.
CPC ........... *H04N 5/2171* (2013.01); *B05B 1/267* (2013.01); *B08B 3/02* (2013.01); *B08B 5/02* (2013.01); *B60S 1/0848* (2013.01); *B60S 1/52* (2013.01); *B60S 1/54* (2013.01); *B60S 1/56* (2013.01); *H04N 5/232* (2013.01); *H04N 5/2252* (2013.01)

(58) Field of Classification Search
CPC .. B05B 1/26; B05B 1/267; B08B 3/02; B08B 5/02; B60S 1/0848; B60S 1/52; B60S 1/54; B60S 1/56; H04N 5/2171; H04N 5/2252; H04N 5/232
See application file for complete search history.

(56) References Cited

U.S. PATENT DOCUMENTS 2,260,113 A * 10/1941 Frost .................. F04B 39/0005
                                                 119/14.44
5,299,573 A *  4/1994 Kobayashi ............. A61B 3/165
                                                 600/401

(Continued)

FOREIGN PATENT DOCUMENTS

| DE | 4105379 A1 * | 8/1992 | .......... B05B 1/3006 |
|---|---|---|---|
| JP | 2001-171491 A | 6/2001 | |
| WO | WO-2015159763 A1 * | 10/2015 | .............. B60R 1/00 |

*Primary Examiner* — Marc Carlson
(74) *Attorney, Agent, or Firm* — Osha Liang LLP

(57) ABSTRACT

A cleaner includes a high-pressure air generation unit and a nozzle. The high-pressure air generation unit includes a cylinder, a piston supported to the cylinder to be freely moveable and deliver the high-pressure air toward the nozzle, an urging spring urges the piston, and a movement mechanism which moves the piston to a predetermined position. The movement mechanism comprises a worm which rotate by a driving unit, and a worm wheel meshed with the worm and which rotate in association with rotation of the worm. The worm wheel comprises a pinion having gear teeth protruding from an outer periphery thereof. The piston is coupled with a rack having rack teeth which mesh with the gear teeth, and wherein an interval between each gear tooth of the gear teeth and one adjacent gear tooth is different from an interval between each gear tooth and the other adjacent gear tooth.

6 Claims, 8 Drawing Sheets

(51) Int. Cl.
　　　*B60S 1/54*　　　(2006.01)
　　　*B08B 5/02*　　　(2006.01)
　　　*H04N 5/232*　　(2006.01)
　　　*H04N 5/225*　　(2006.01)

(56) References Cited

U.S. PATENT DOCUMENTS

| | | | |
|---|---|---|---|
| 2010/0167236 A1* | 7/2010 | Edwards | A61C 1/0084 433/89 |
| 2011/0245736 A1* | 10/2011 | Foehrenbach | A61B 17/22012 601/4 |
| 2014/0023537 A1* | 1/2014 | Wang | F04B 33/005 417/437 |
| 2017/0028968 A1* | 2/2017 | Kubota | B60R 1/00 |
| 2018/0142688 A1* | 5/2018 | Otomi | F16H 33/02 |

\* cited by examiner

CLEANER AND VEHICLE WITH CLEANER

CROSS-REFERENCE TO RELATED APPLICATION

The present application claims the benefit of priority of Japanese Patent Application No. 2016-240128, filed on Dec. 12, 2016, the disclosure of which is incorporated herein by reference.

TECHNICAL FIELD

The disclosure relates to a cleaner configured to clean a cleaning target object and a vehicle with cleaner.

BACKGROUND ART

In recent years, the number of vehicles equipped with in-vehicle cameras configured to photograph situations around the vehicle is increasing. A lens of the in-vehicle camera, which is an imaging surface, may become dirty due to rain, mud and the like. For this reason, in the related art, a device configured to remove foreign matters by blowing a cleaning liquid, compressed air or the like to the lens of the in-vehicle camera so as to remove foreign matters such as water droplets adhering to the lens has been known.

For example, Patent Document 1 discloses configurations of providing a compressed air generation unit in the vicinity of an in-vehicle camera, and injecting compressed air of the compressed air generation unit from a nozzle to blow the high-pressure air to a front glass of the in-vehicle camera, thereby removing water droplets adhering to the front glass (refer to JP-A-2001-171491).

In the configuration disclosed in Patent Document 1, there are rooms for further improvement on efficient generation of the high-pressure air.

SUMMARY OF THE INVENTION

It is an aspect of a present invention to provide a cleaner and a vehicle with cleaner capable of efficiently generating high-pressure air with a simple configuration.

According to an embodiment of the present invention, there is provided, a cleaner for cleaning a cleaning target object, the cleaner including: a high-pressure air generation unit configured to generate high-pressure air, and a nozzle configured to inject the high-pressure air toward a surface to be cleaned of the cleaning target object, wherein the high-pressure air generation unit includes: a cylinder in which air is to be introduced, a piston supported to the cylinder to be freely moveable and configured to deliver the high-pressure air toward the nozzle, an urging spring configured to urge the piston, and a movement mechanism configured to move the piston to a predetermined position by applying a moving force to the piston, wherein the movement mechanism comprises a worm configured to rotate by a driving unit, and a worm wheel meshed with the worm and configured to rotate in association with rotation of the worm, wherein the worm wheel comprises a pinion having a plurality of gear teeth protruding from an outer periphery thereof, wherein the piston is coupled with a rack having a plurality of rack teeth configured to mesh with the plurality of gear teeth, and wherein an interval between each gear tooth of the plurality of gear teeth and one adjacent gear tooth is different from an interval between each gear tooth and the other adjacent gear tooth.

According to the above configuration, a movement amount of the piston is increased when the piston shifts from a maximum compressed state of the urging spring to an exhaust state, so that it is possible to efficiently generate the high-pressure air (i.e., to increase displacement per piston cycle).

In the cleaner according to the above, the outer periphery of the pinion may be provided with four gear teeth and four tooth missing portions, which are portions at which the four gear teeth are not provided, the four tooth missing portions may configure a first pair facing each other and a second pair provided between the first pair, and a length of each of the tooth missing portions configuring the first pair may be shorter than a length of each of the tooth missing portions configuring the second pair.

According to the above configuration, it is possible to increase the movement amount of the piston with the simpler configuration.

In the cleaner according to the above, the four gear teeth may configure a first pair facing each other and a second pair provided between the first pair, the plurality of rack teeth may be configured by a first rack tooth provided at an opposite end portion to the piston and a second rack tooth provided closer to the piston than the first rack tooth, and when the rack is moved and the worm wheel is rotated as the piston is moved, the gear teeth configuring the second pair and the second rack tooth may pass each other.

According to the above configuration, when the rack moves, the second pair of gear teeth of the pinion and the second rack tooth of the rack are not contacted to each other. Therefore, even when the air stays in the high-pressure air generation unit, the unnecessary meshing is not caused between the pinion and the rack. For this reason, even when the nozzle is clogged, the operation of the high-pressure air generation unit to generate the high-pressure air is not highly influenced and it is possible to suppress damages of the high-pressure air generation unit and generation of an abnormal sound.

In the cleaner according to the above, a width of each of the second pair of gear teeth may be a half or smaller of a width of each of the first pair of gear teeth, and a width of the second rack tooth may be a half or smaller of a width of the first rack tooth.

According to the above configuration, it is possible to simplify the structures of the pinion and the rack.

In the cleaner according to the above, a length of each of the tooth missing portions configuring the second pair may be equivalent to a movement range of the piston.

According to the above configuration, it is possible to adjust the movement range of the piston, in correspondence to the length of the tooth missing portion configuring the second pair.

According to an embodiment of the present invention, there is provided, a vehicle comprising the cleaner according to the above configuration the above configuration.

According to the above configuration, it is possible to efficiently generate the high-pressure air.

According to the cleaner of the disclosure, it is possible to efficiently generate the high-pressure air with the simple configuration. Also, according to the vehicle with cleaner of the disclosure, it is possible to efficiently generate the high-pressure air with the simple configuration.

DETAILED DESCRIPTION

Hereinafter, an example of the illustrative embodiment will be described with reference to the drawings.

A cleaner of the disclosure is applied as a device for removing foreign matters such as water droplets, mud and dust adhering to an in-vehicle camera (an example of the cleaning target object) with high-pressure air.

Figure 1B:
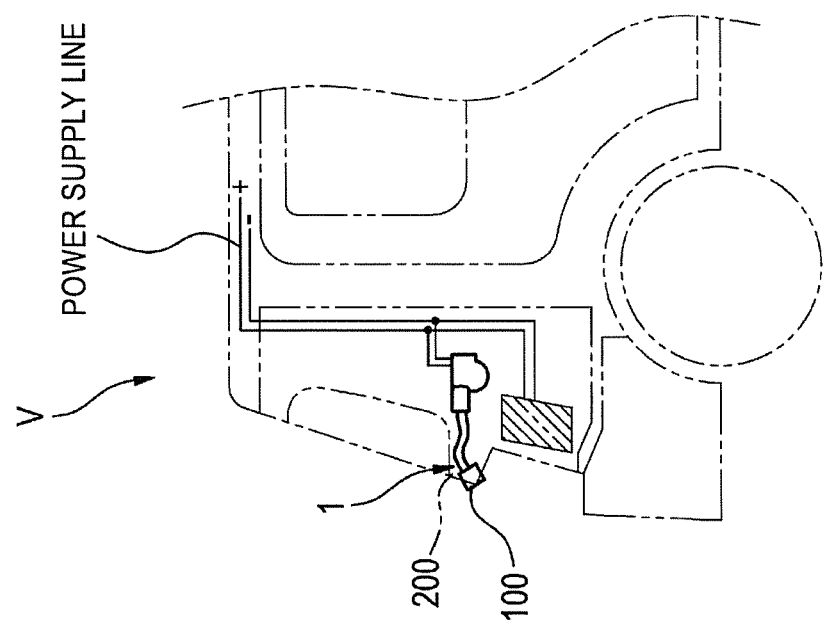
FIG. 1B is a side view of the vehicle (the cleaner is shown in a projective manner).
Figure 1A:
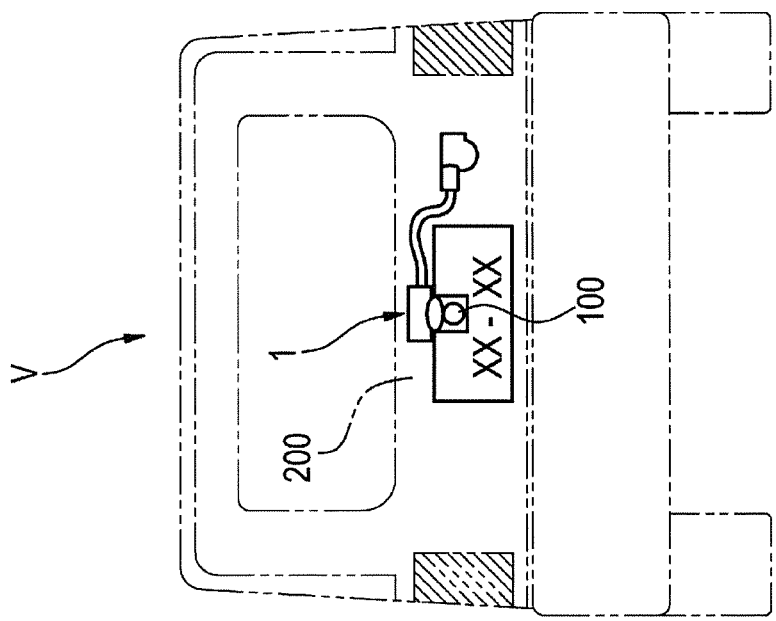
FIG. 1A is a rear view of a vehicle (a cleaner is shown in a projective manner)

As shown in FIGS. 1A and 1B, a cleaner 1 is mounted to a rear part (for example, a vehicle body panel of a back door 200) of a vehicle V. An in-vehicle camera 100 (an example of the cleaning target object) is a camera for checking, for example, the rear of the vehicle, and is mounted so that a lens of the in-vehicle camera 100 is exposed toward an outside of the back door 200 of the vehicle. For example, with a triggering that a gear of the vehicle V enters a reverse mode, a vehicle control unit (ECU; not shown) causes the in-vehicle camera 100 to start photographing. Also, the cleaner 1 is controlled to operate by the vehicle control unit (ECU) upon the start of photographing of the in-vehicle camera 100, for example.

In the meantime, the in-vehicle camera 100 may also be mounted in a vehicle interior, for example. In this case, the in-vehicle camera 100 is mounted at a place close to a rear glass (an example of a partition wall becoming a surface to be cleaned), for example, and is configured to check a measuring target at the rear of a vehicle outside with the rear glass being interposed therebetween. Also, the in-vehicle camera 100 may also be mounted in a rear lamp, for example. In this case, the in-vehicle camera 100 is configured to check a measuring target at the rear of the vehicle outside with an outer cover (an example of a partition wall becoming a surface to be cleaned) of the rear lamp being interposed therebetween. Also, the in-vehicle camera 100 may be mounted in another in-vehicle component, which is a cleaning target object (having the cleaning target object), for example, in a side turn signal lamp (STSL).

Figure 2:
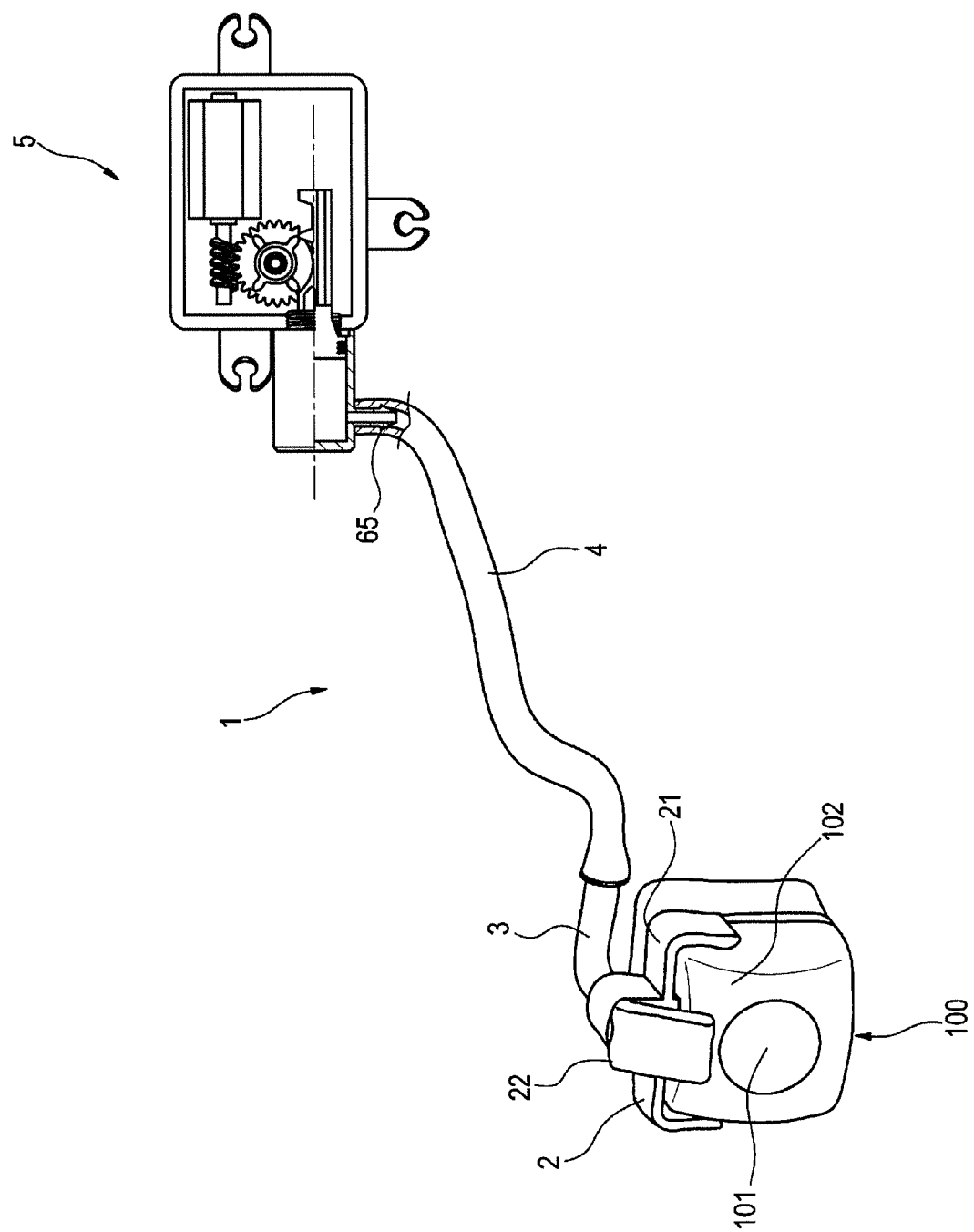
FIG. 2 is a perspective view of a cleaner in accordance with an illustrative embodiment of the disclosure.

As shown in FIG. 2, the cleaner 1 includes a nozzle unit 2, a joint member 3, a hose 4, and a pump 5 (an example of the high-pressure air generation unit).

The nozzle unit 2 includes a mounting part 21 and a nozzle 22, and is detachably mounted to the in-vehicle camera 100 via the mounting part 21. The mounting part 21 is mounted to a housing 102 of the in-vehicle camera 100 so as to cover a top surface of the in-vehicle camera 100. The nozzle 22 is configured to inject high-pressure air toward a lens 101 (an example of the surface to be cleaned) of the in-vehicle camera 100. The nozzle 22 is formed integrally with the mounting part 21, and is provided in such a way that a tip end of the nozzle 22 faces toward the lens 101 when the mounting part 21 is mounted to the housing 102. The nozzle unit 2 is formed of a resin material, for example.

The joint member 3 is a member for joining the nozzle 22 of the nozzle unit 2 and the hose 4. One end portion of the joint member 3 is coupled to the nozzle 22 and the opposite end portion thereof is coupled to the hose 4. The hose 4 is a piping member configured to couple the nozzle 22 and the pump 5, together with the joint member 3. One end portion of the hose 4 is coupled to the joint member 3 and the opposite end portion thereof is coupled to a coupling discharge part 65 of the pump 5. The joint member 3 is formed of a resin material, for example. The hose 4 is formed of a material such as resin or rubber, for example.

The pump 5 is configured to generate high-pressure air to be delivered to the nozzle 22. The generated high-pressure air is sent from a discharge port 65a of the coupling discharge part 65 to the nozzle 22 via the hose 4 and the joint member 3. The pump 5 is mounted to a part of the vehicle body inside the vehicle, for example.

In the meantime, the in-vehicle camera 100 and the cleaner 1 are not limited to the rear end-side of the vehicle, and may also be mounted to a body panel of the vehicle such as a front side and a side. Also, the cleaner 1 may be applied as not only a device for the in-vehicle camera 100 but also a device configured to remove foreign matters adhering to a vehicular lamp, a window, a mirror, a sensor for collision prevention and the like.

Figure 3:
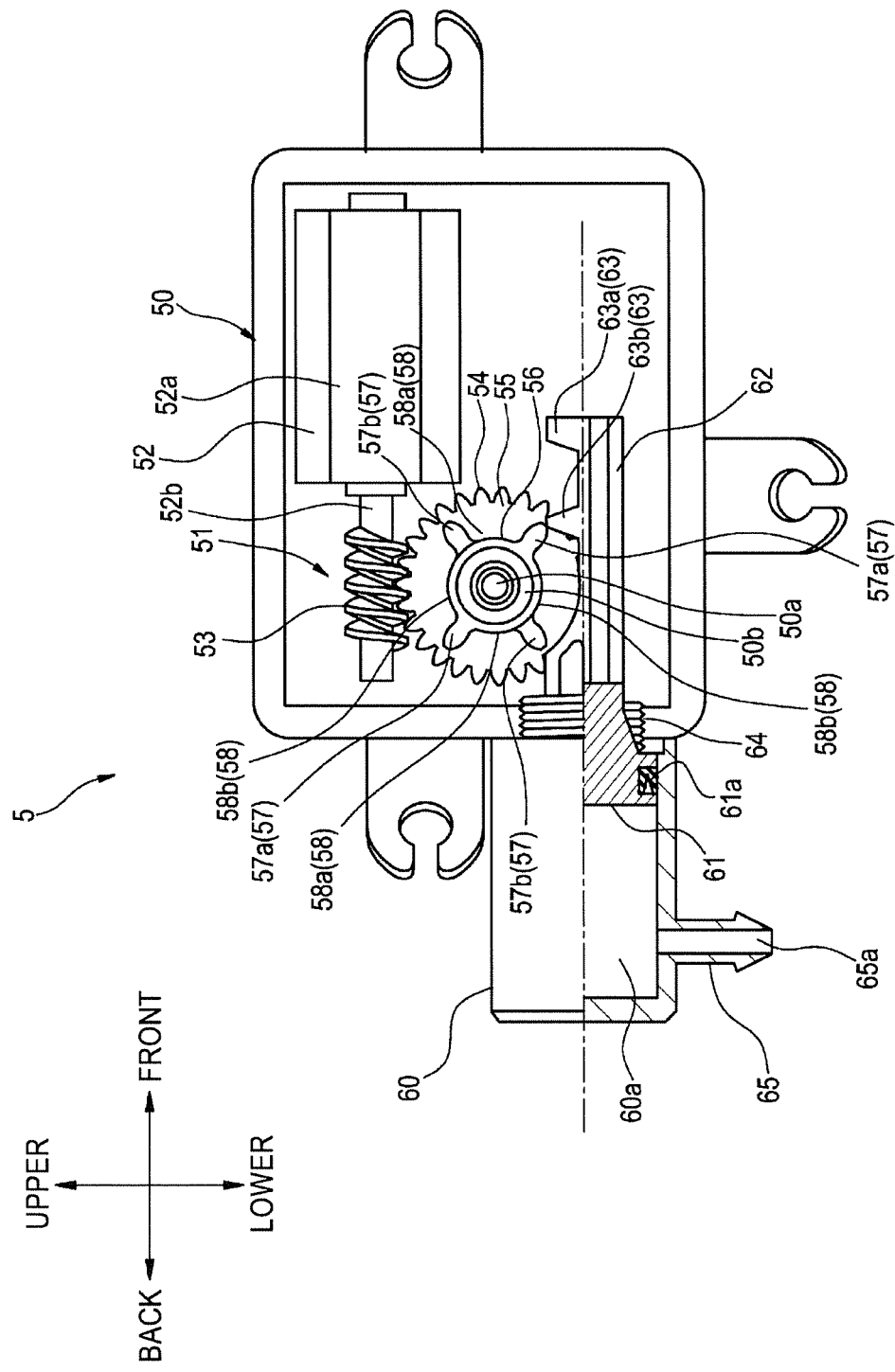
FIG. 3 is a high-pressure air generation unit provided to the cleaner.

As shown in FIG. 3, the pump 5 includes a case part 50 in which a movement mechanism 51 is accommodated, and a cylinder 60 in which a piston 61 is accommodated. In the below descriptions, as shown in FIG. 3, front and back, upper and lower, and right and left directions are indicated while referring to a direction in which the piston 61 moves as 'front and back direction'.

The movement mechanism 51 includes a driving motor 52 (an example of the driving unit), a worm 53, and a worm wheel 54.

The driving motor 52 includes a main body part 52a, and a motor shaft 52b extending backward from the main body part 52a. The worm 53 is fixed to the motor shaft 52b, and the worm 53 is configured to rotate in association with rotation of the motor shaft 52b.

The worm wheel 54 is configured by a driven gear (helical gear) 55 and a pinion 56 protruding laterally from a central portion of the driven gear 55, which are integrally formed. The worm wheel 54 is supported at a central part thereof to a support shaft part 50a of the case part 50 via a bearing 50b.

The pinion 56 is provided coaxially with the driven gear 55, and an outer diameter of the pinion 56 is smaller than an outer diameter of the driven gear 55. The driven gear 55 is meshed with the worm 53, and is configured to rotate in association with rotation of the worm 53. The pinion 56 is externally fitted and supported to the bearing 50b, and is configured to rotate in association with rotation of the driven gear 55. The driven gear 55 and the pinion 56 are configured to rotate in a counterclockwise direction, in FIG. 3.

An outer periphery of the pinion 56 is formed with a plurality of gear teeth 57 (four gear teeth, in this example) protruding radially, and tooth missing portions 58 (four tooth missing portions, in this example), which are portions at which gear teeth are not provided.

Of the four gear teeth 57, the gear teeth facing each other (the gear teeth 57a facing each other, and the gear teeth 57b facing each other) have the same shape. The gear teeth 57a and 57a facing each other configure a first pair, and the gear teeth 57b and 57b provided between the first pair and facing each other configure a second pair. Each gear tooth of the four gear teeth 57 has an interval between each gear tooth and one adjacent gear tooth, which is different from an interval between each gear tooth and the other adjacent gear tooth. For example, an interval between one gear tooth 57*a* and the adjacent gear tooth 57*b* on the rear side in a rotation direction of the pinion 56 is longer than an interval between one gear tooth 57*a* and the adjacent gear tooth 57*b* on the front side in the rotation direction.

Of the four tooth missing portions 58, the tooth missing portions facing each other (the tooth missing portions 58*a* facing each other, and the tooth missing portions 58*b* facing each other) have the same shape. The tooth missing portions 58*a* and 58*a* facing each other configure a first pair, and the tooth missing portions 58*b* and 58*b* provided between the first pair and facing each other configure a second pair. A length of the tooth missing portion 58*a* is shorter than a length of the tooth missing portion 58*b*.

The cylinder 60 is coupled to a rear end portion of the case part 50 with protruding backward from the case part 50. A space 60*a* in which the piston 61 is supported to be freely moveable in the front and back direction is formed in the cylinder 60. The rear of the cylinder 60, which is a direction in which the piston 61 is to move so as to deliver the air staying in the space 60*a* from the coupling discharge part 65, is a delivery direction, and the front, which is an opposite direction to the delivery direction, is a direction in which the air is to be collected in the space 60*a*. FIG. 3 depicts the piston 61 at a state where it is most moved in the opposite direction to the delivery direction.

The piston 61 has a substantial cylinder shape, and an outer periphery of the piston 61 is formed with a circular ring-shaped recess. In the recess of the piston 61, a seal member 61*a* made of an elastically deformable material such as rubber, resin or the like is arranged. A diameter of the seal member 61*a* is slightly greater than a diameter of the piston 61, and an outer periphery of the seal member 61*a* slightly protrudes outward from the outer peripheral surface of the piston 61. The piston 61 is configured so that the seal member 61*a* is to slide relative to an inner peripheral surface of the cylinder 60 in the space 60*a*.

An inner periphery of a front part of the cylinder 60 is formed with an air introduction groove (not shown) extending in the front and back direction. When the piston 61 is moved toward the front of the cylinder 60, a gap equivalent to the air introduction groove is formed between the inner peripheral surface of the cylinder 60 and the outer peripheral surface of the seal member 61*a* at a part at which the air introduction groove is formed, and the air (exterior air) is introduced into the space 60*a* through the gap.

The piston 61 is configured to reciprocally move in the front and back direction relative to the cylinder 60. When the piston 61 is most moved backward, the outer peripheral surface of the seal member 61*a* is positioned to block the discharge port 65*a* of the coupling discharge part 65 from the space 60*a* of the cylinder 60, for example. In contrast, when the piston 61 is most moved forward, the seal member 61*a* is positioned so that the air is to be introduced into the space 60*a* through the air introduction groove, for example.

A front side of the piston 61 is coupled with a rack 62 extending in the front and back direction. The rack 62 extends into the case part 50 with being inserted into an insertion hole formed in the case part 50. The rack 62 is configured to reciprocally move in the front and back direction, together with the piston 61. An upper surface of the rack 62 is provided with a plurality of rack teeth 63 (two rack teeth, in this example). The two rack teeth 63 are configured by a first rack tooth 63*a* provided at an opposite end portion (a front end portion of the rack 63) to the piston 61 and a second rack tooth 63*b* provided (at the rear side) closer to the piston 61 than the first rack tooth 63*a*. An interval between the first rack tooth 63*a* and the second rack tooth 63*b* is substantially the same as the interval between the gear tooth 57*b* of the pinion 56 and the adjacent gear tooth 57*a* on the rear side in the rotation direction of the pinion 56. The rack teeth 63 of the rack 62 are configured to be meshed with the gear teeth 57 of the pinion 56.

An urging spring 64 is supported in the cylinder 60 between a front end portion of the piston 61 and a rear outer surface of the case part 50. The urging spring 64 is configured by a compression coil, for example, and is configured to urge the piston 61 and the rack 62 coupled to the piston 61 backward (in the delivery direction).

A lower part of the cylinder 60 is formed with the coupling discharge part 65 protruding downward. A diameter of the discharge port 65*a* of the coupling discharge part 65 is smaller than a diameter of the space 60*a* of the cylinder 60.

Figure 4:
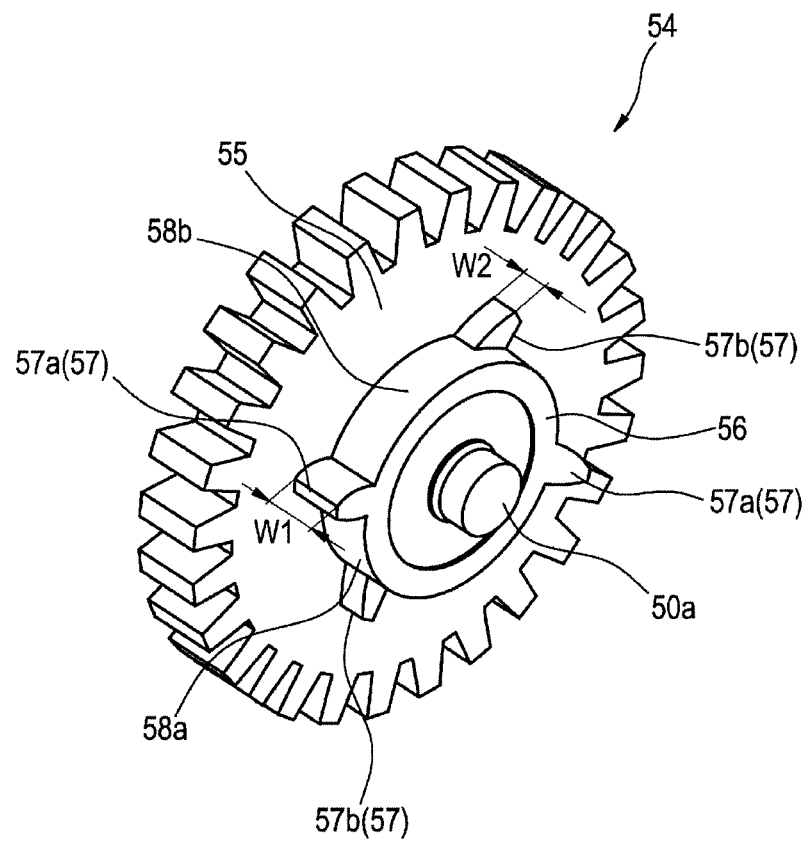
FIG. 4 is a perspective view of a worm wheel.

As shown in FIG. 4, a width $W_2$ of each of the second pair of gear teeth 57*b* of the pinion 56 of the worm wheel 54 is a half or smaller of a width $W_1$ of each of the first pair of gear teeth 57*a*. The gear teeth 57*b* formed on the outer periphery of the pinion 56 are positioned on a side surface of the driven gear 55.

Figure 5:
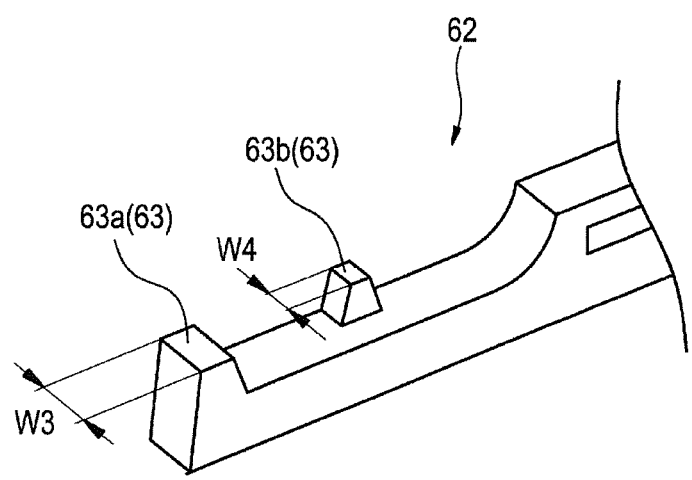
FIG. 5 is a perspective view of a rack.

As shown in FIG. 5, a width $W_4$ of the second rack tooth 63*b* of the rack 62 is a half or smaller of a width $W_3$ of the first rack tooth 63*a*. At a state where the rack teeth 63 are meshed with the gear teeth 57 of the pinion 56, the second rack tooth 63*b* is positioned at a side spaced from the side surface of the driven gear 55.

In the below, the operations of the cleaner 1 at a normal state are described with reference to FIGS. 6 and 7.

Figure 6A:
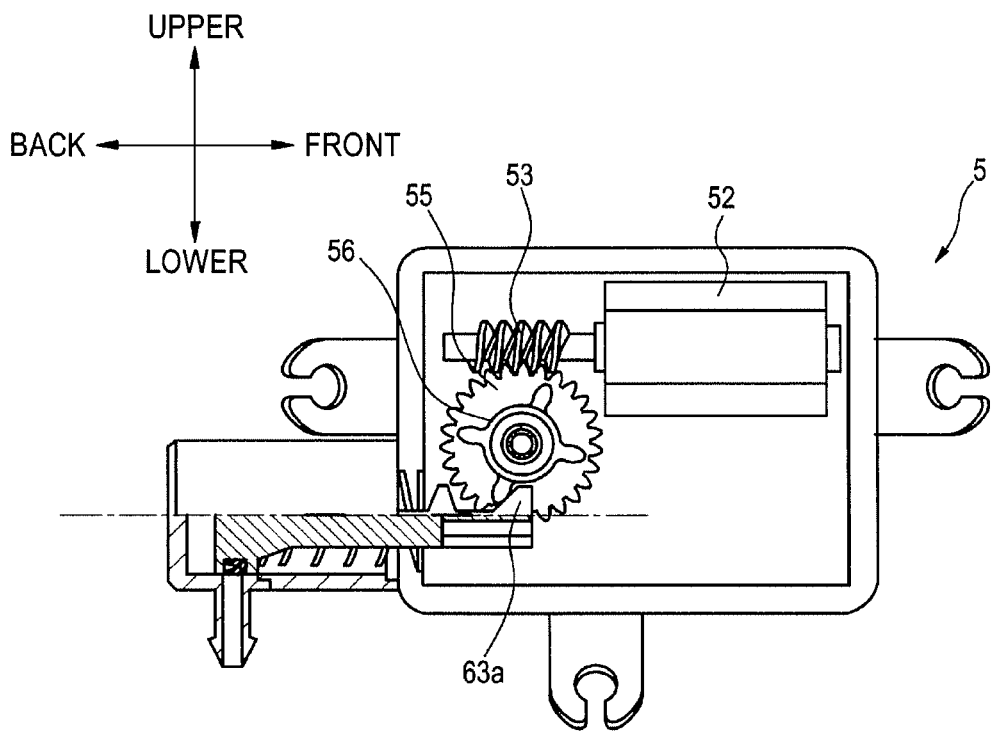
FIGS. 6A and 6B illustrate operations of the cleaner at a normal state.

For example, when a gear of the vehicle V is switched into a reverse mode or an operation switch of the cleaner 1 becomes an ON state, the driving motor 52 is driven under control of the vehicle control unit (ECU). The driving motor 52 is driven, so that the worm 53 is rotated and the driven gear 55 of the worm wheel 54 meshed with the worm 53 is thus rotated in a counterclockwise direction in FIG. 6. When the driven gear 55 is rotated, the pinion 56 formed integrally with the driven gear 55 is rotated, so that the gear tooth 57*b* configuring the second pair of the pinion 56 is first meshed with the first rack tooth 63*a* of the rack 62, as shown in FIG. 6A.

Figure 6B:
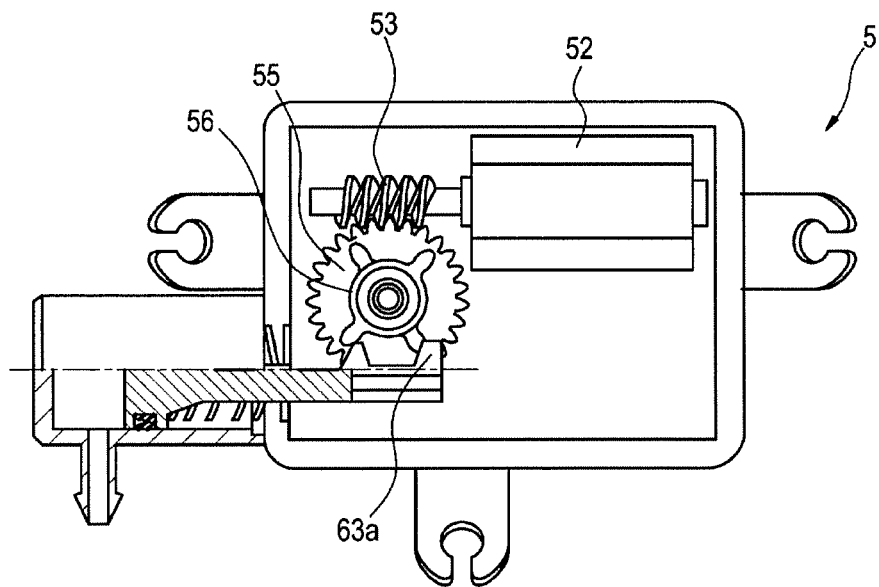

When the pinion 56 is further rotated, the rack 62 is moved by a predetermined amount in the opposite direction (forward) to the delivery direction against the urging force of the urging spring 64 by the meshing with the gear tooth 57*b*, as shown in FIG. 6B. When the rack 62 is moved by the predetermined amount, the gear tooth 57*a* configuring the first pair of the pinion 56 is meshed with the second rack tooth 63*b* of the rack 62, as shown in FIG. 6B.

Figure 7A:
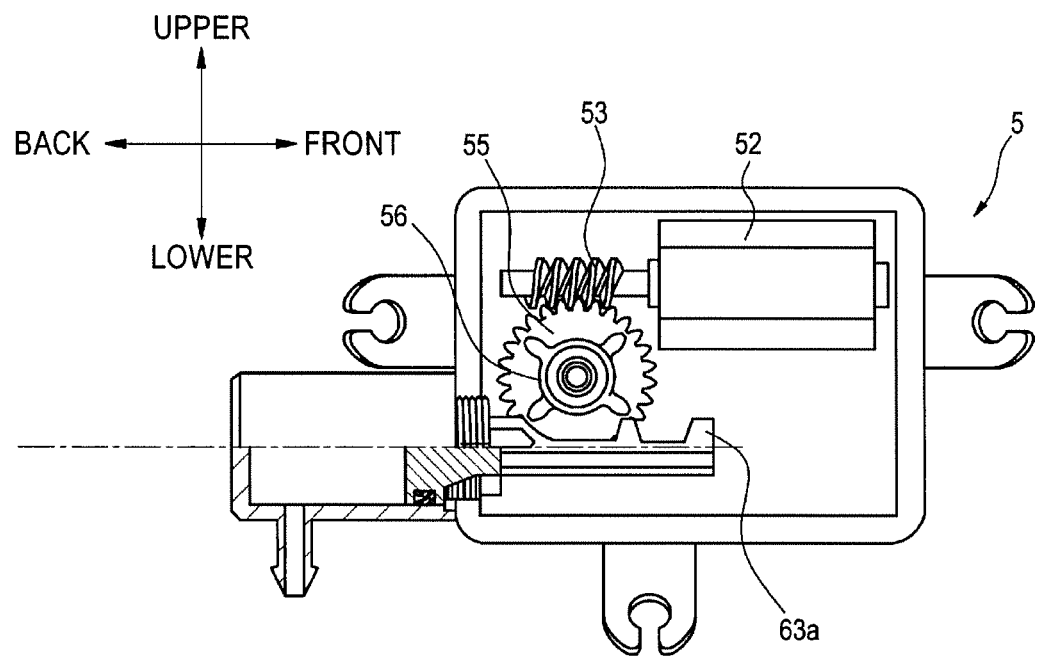
FIGS. 7A and 7B illustrate operations of the cleaner at the normal state, following FIGS. 6A and 6B.

When the pinion 56 is further rotated, the rack 62 is moved further forward by the meshing with the gear tooth 57*a*, so that it is moved up to a position at which the meshing between the second rack tooth 63*b* and the gear tooth 57*a* is released, as shown in FIG. 7A. At this time, the urging spring 64 is most compressed and the piston 61 is located at the most forward position. Also, the air is introduced into the space 60*a* of the cylinder 60 through the air introduction groove.

Figure 7B:
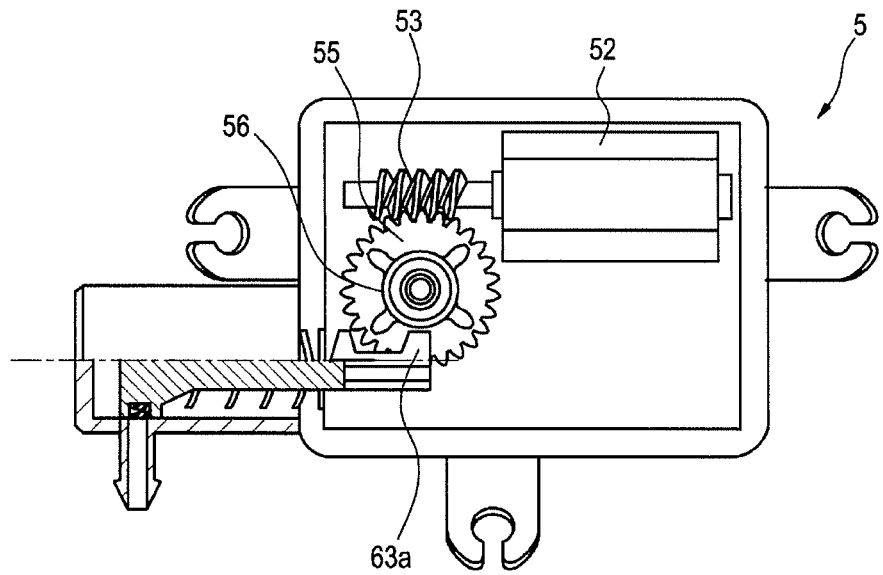

When the meshing between the second rack tooth 63*b* and the gear tooth 57*a* is released, the piston 61 is moved in the delivery direction (backward) by the urging force of the urging spring 64, as shown in FIG. 7B. In this case, for example, in FIG. 7B, when the interval between the gear tooth 57*a* of the pinion 56 and the adjacent gear tooth 57*b* on the rear side in the rotation direction of the pinion 56, i.e., the length of the tooth missing portion 58b of the pinion 56 is short, the first rack tooth 63a of the rack 62 moving backward is contacted to the gear tooth 57b of the pinion 56, so that the moving distance of the rack 62 in the backward direction is reduced. In contrast, in this example, the length of the tooth missing portion 58b is longer than the length of the tooth missing portion 58a, and the gear tooth 57b of the pinion 56 is formed at a position at which it is not contacted to the first rack tooth 63a of the rack 62 moving backward, as shown in FIG. 7B. For this reason, when the meshing between the second rack tooth 63b and the gear tooth 57a is released, the piston 61 is moved to the most backward position. In the meantime, the length of the tooth missing portion 58b is preferably set to be substantially equal to a movement range of the piston 61 in the front and back direction.

By the movement of the piston 61, the air in the space 60a is delivered from the discharge port 65a of the coupling discharge part 65 having the diameter smaller than the space 60a toward the nozzle 22, as high-pressure air. The high-pressure air is injected from the nozzle 22 and is blown to the lens 101 of the in-vehicle camera 100.

In the below, the operations of the cleaner 1, which are performed when the nozzle 22 is clogged due to freezing or the like, are described with reference to FIGS. 8 and 9.

Figure 8A:
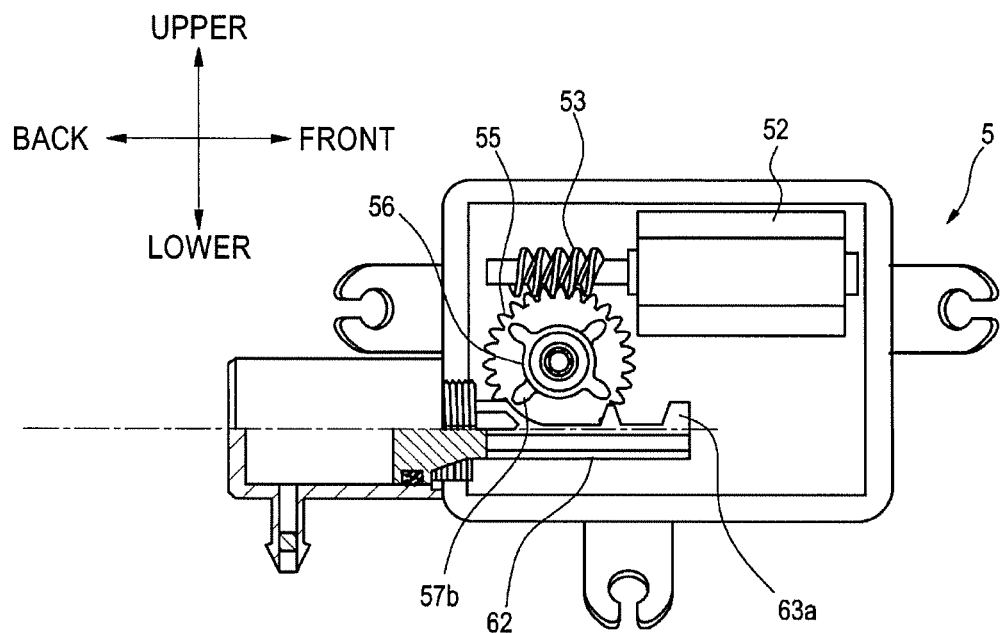
FIGS. 8A and 8B illustrate operations of the cleaner upon closing of a nozzle.

Like FIGS. 6A and 6B, the gear tooth 57b of the pinion 56 and the first rack tooth 63a of the rack 62 are meshed, and the gear tooth 57a and the second rack tooth 63b are subsequently meshed, so that the rack 62 is moved forward. Then, as shown in FIG. 8A, the rack 62 is moved up to the position at which the meshing between the second rack tooth 63b and the gear tooth 57a is released. At this time, the urging spring 64 is most compressed, and the piston 61 is located at the most forward position. Also, the air is introduced into the space 60a of the cylinder 60 through the air introduction groove.

Figure 8B:
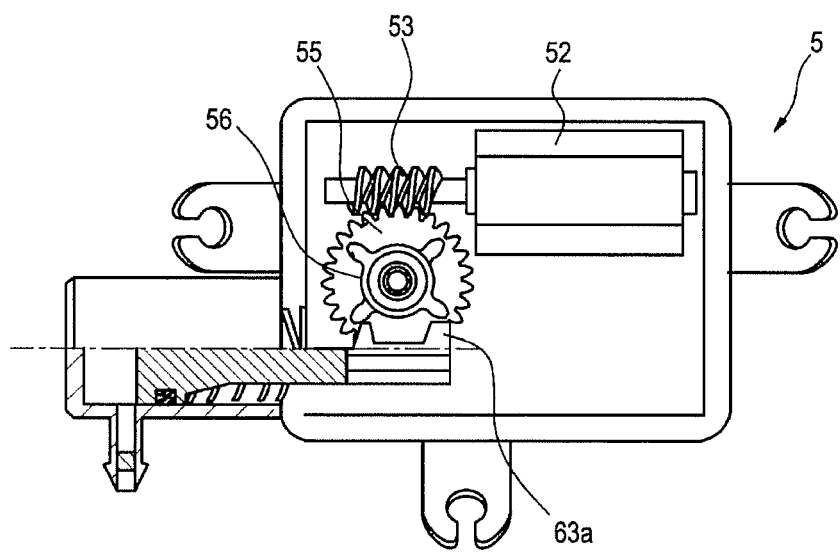

When the meshing between the second rack tooth 63b and the gear tooth 57a is released, the piston 61 is moved in the delivery direction (backward) by the urging force of the urging spring 64, as shown in FIG. 8B. In this case, since the nozzle 22 is clogged due to the freezing C, for example, the air in the space 60a is not delivered from the discharge port 65a of the coupling discharge part 65. For this reason, the air stays in the space 60a, so that the piston 61 is not sufficiently moved backward and stops without reaching the maximum moving position, as shown in FIG. 8B.

Figure 9A:
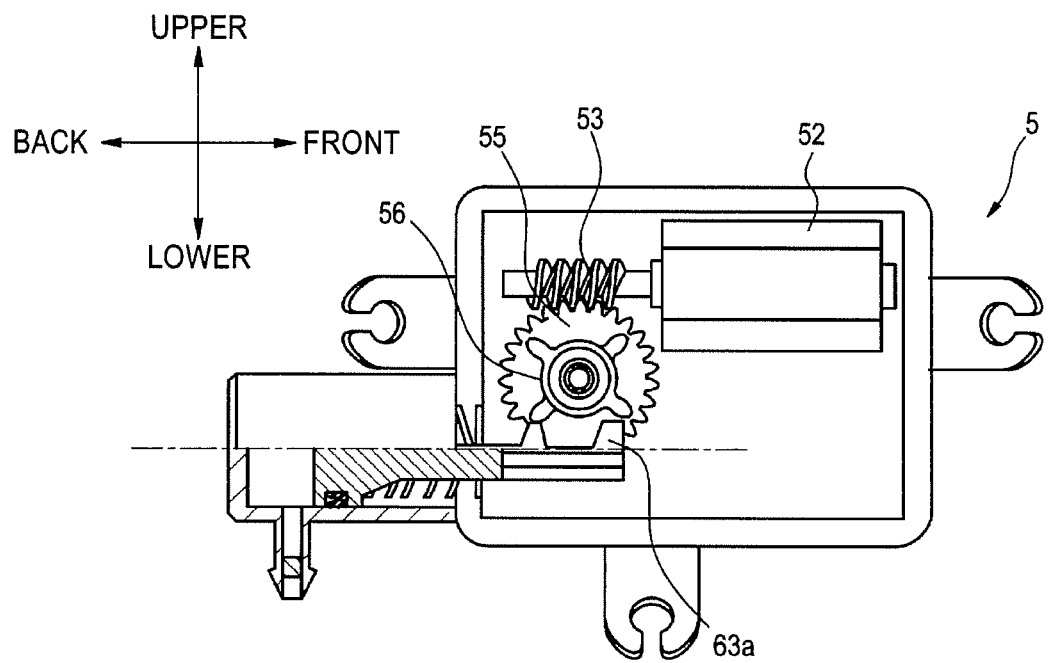
FIGS. 9A and 9B illustrate operations of the cleaner upon closing of the nozzle, following FIGS. 8A and 8B.

When the pinion 56 is rotated (in the counterclockwise direction) from this state, since the width $W_2$ of the gear tooth 57b and the width $W_4$ of the second rack tooth 63b are formed narrow, as shown in FIGS. 4 and 5, the gear tooth 57b passes without being meshed with the second rack tooth 63b, as shown in FIG. 9A.

Figure 9B:
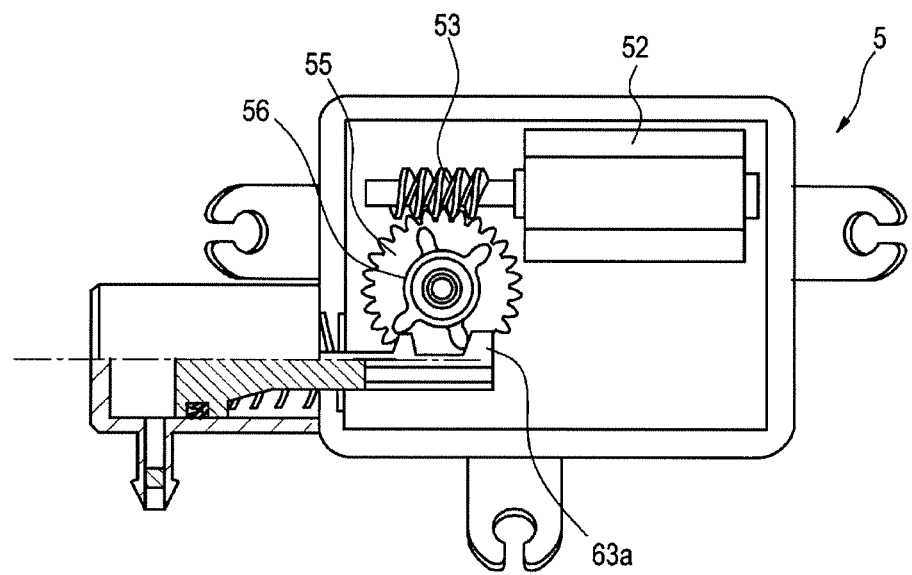

Thereafter, as shown in FIG. 9B, the gear tooth 57b of the pinion 56 is meshed with the first rack tooth 63a of the rack 62, and the gear tooth 57a is meshed with the second rack tooth 63b, so that the rack 62 is moved forward. Then, the cleaner is again at the state of FIG. 8A, so that the above operations are repeated.

On the other hand, when the clogging of the nozzle 22 is thereafter solved, the cleaner 1 returns to the normal operations shown in FIGS. 6A, 6B, 7A and 7B.

According to the cleaner 1 having the above configuration, the interval between the gear tooth 57a of the pinion 56 and the adjacent gear tooth 57b on the rear side in the rotation direction is formed longer than the interval between the gear tooth 57a and the adjacent gear tooth 57b on the front side in the rotation direction. For this reason, when the meshing between the second rack tooth 63b of the rack 62 and the gear tooth 57a of the pinion 56 is released and the rack 62 is thus moved backward, the first rack tooth 63a of the rack 62 is not contacted to the adjacent gear tooth 57b on the rear side in the rotation direction. Therefore, the piston 61 formed integrally with the rack 62 is moved to the most backward position by the urging of the urging spring 64. Thereby, it is possible to increase the movement amount of the piston 61 in the front and back direction, so that it is possible to efficiently generate the high-pressure air. Also, since the pinion 56 is formed with the first pair of gear teeth 57a, 57a and the second pair of gear teeth 57b, 57b, it is possible to reciprocate the piston 61 two times while the driven gear rotates one revolution. That is, while keeping the number of reciprocation times of the piston 61 during one revolution of the driven gear, it is possible to increase displacement per piston cycle.

Also, when the length of each of the second pair of tooth missing portions 58b facing each other is made longer than the length of each of the first pair of the tooth missing portions 58a, it is possible to move the piston 61 to the most backward position, like the above case, and to increase the movement amount of the piston 61 in the front and back direction. Therefore, it is possible to efficiently generate the high-pressure air with the simpler configuration.

Also, since the length of the tooth missing portion 58b configuring the second pair is set to be substantially equal to the movement range of the piston 61, it is possible to avoid the contact between the first rack tooth 63a and the gear tooth 57b, and to largely secure the moving amount of the piston 61 in the backward direction. Therefore, it is possible to adjust the movement range of the piston 61, in correspondence to the length of the tooth missing portion 58b configuring the second pair.

Also, the width of each of the second pair of gear teeth 57b of the pinion 56 is set to the half or smaller of the width of each of the first pair of gear teeth 57a, and the width of the second rack tooth 63b of the rack 62 is set to the half or smaller of the width of the first rack tooth 63a. For this reason, when the pinion 56 is rotated or when the rack 62 is moved backward, the second pair of gear teeth 57b of the pinion 56 and the second rack tooth 63b of the rack 62 are not contacted to each other, so that the unnecessary meshing is not caused between the pinion 56 and the rack 62. Therefore, for example, even when the nozzle 22 is clogged and thus the air stays in the space 60a of the cylinder 60, the operation of the pump 5 to generate the high-pressure air is not highly influenced, and it is possible to suppress damages of the pump 5 and generation of an abnormal sound. Also, it is possible to simplify the structures of the pinion 56 and the rack 62.

Also, according to the vehicle V having the cleaner 1, it is possible to efficiently generate the high-pressure air with the simple configuration.

The disclosure is not limited to the illustrative embodiment, and can be appropriately modified and improved. In addition, the materials, shapes, sizes, numerical values, forms, the number, arrangement places and the like of the respective constitutional elements of the illustrative embodiment are arbitrary and are not particularly limited inasmuch as it is possible to implement the disclosure.

The invention claimed is:

1. A cleaner for cleaning a cleaning target object, the cleaner comprising:
    a high-pressure air generation unit configured to generate high-pressure air, and a nozzle configured to inject the high-pressure air toward a surface to be cleaned of the cleaning target object, wherein the high-pressure air generation unit comprises:
- a cylinder in which air is to be introduced,
- a piston supported to the cylinder to be freely moveable and configured to deliver the high-pressure air toward the nozzle,
- an urging spring configured to urge the piston, and
- a movement mechanism configured to move the piston to a predetermined position by applying a moving force to the piston, wherein the movement mechanism comprises a worm configured to rotate by a driving unit, and a worm wheel meshed with the worm and configured to rotate in association with rotation of the worm, wherein the worm wheel comprises a pinion having first, second, third, and fourth gear teeth protruding from an outer periphery thereof, wherein the piston is coupled with a rack having a plurality of rack teeth configured to mesh with the first, second, third, and fourth gear teeth, wherein the first gear tooth is diametrically opposed to the third gear tooth and the second gear tooth is diametrically opposed to the fourth gear tooth, wherein the first gear tooth is directly adjacent to the second and fourth gear teeth, and the third gear tooth is directly adjacent to the second and fourth gear teeth, and wherein an interval between the first and second gear teeth is different from an interval between the second and third gear teeth, and the interval between the third and fourth gear teeth is different from the interval between the fourth and first gear teeth.

2. The cleaner according to claim 1, wherein the outer periphery of the pinion is provided with four tooth missing portions which are portions at which the first, second, third, and fourth gear teeth are not provided, wherein the four tooth missing portions configure a first pair facing each other and a second pair provided between the first pair, and wherein a length of each of the tooth missing portions configuring the first pair is shorter than a length of each of the tooth missing portions configuring the second pair.

3. The cleaner according to claim 2, wherein the plurality of rack teeth is configured by a first rack tooth provided at an opposite end portion to the piston and a second rack tooth provided closer to the piston than the first rack tooth, and wherein when the rack is moved and the worm wheel is rotated as the piston is moved, the second and fourth gear teeth pass the second rack tooth.

4. The cleaner according to claim 3, wherein a width of each of the second and fourth gear teeth is a half or smaller of a width of each of the first and third gear teeth, and wherein a width of the second rack tooth is a half or smaller of a width of the first rack tooth.

5. The cleaner according to claim 2, wherein a length of each of the tooth missing portions configuring the second pair is equivalent to a movement range of the piston.

6. A vehicle comprising:

a cleaner for cleaning a cleaning target object, the cleaner comprising:
- a high-pressure air generation unit configured to generate high-pressure air, and
- a nozzle configured to inject the high-pressure air toward a surface to be cleaned of the cleaning target object, wherein the high-pressure air generation unit comprises:
- a cylinder in which air is to be introduced,
- a piston supported to the cylinder to be freely moveable and configured to deliver the high-pressure air toward the nozzle,
- an urging spring configured to urge the piston, and
- a movement mechanism configured to move the piston to a predetermined position by applying a moving force to the piston, wherein the movement mechanism comprises a worm configured to rotate by a driving unit, and a worm wheel meshed with the worm and configured to rotate in association with rotation of the worm, wherein the worm wheel comprises a pinion having first, second, third, and fourth gear teeth protruding from an outer periphery thereof, wherein the piston is coupled with a rack having a plurality of rack teeth configured to mesh with the first, second, third, and fourth gear teeth, wherein the first gear tooth is diametrically opposed to the third gear tooth and the second gear tooth is diametrically opposed to the fourth gear tooth, wherein the first gear tooth is directly adjacent to the second and fourth gear teeth, and the third gear tooth is directly adjacent to the second and fourth gear teeth, and wherein an interval between the first and second gear teeth is different from an interval between the second and third gear teeth, and the interval between the third and fourth gear teeth is different from the interval between the fourth and first gear teeth.

* * * * *